US008867406B2

(12) United States Patent
Ullas et al.

(10) Patent No.: US 8,867,406 B2
(45) Date of Patent: Oct. 21, 2014

(54) SYSTEM AND METHOD FOR AUTOMATED DISCOVERY OF CUSTOMER-EDGE DEVICES AND INTERFACE CONNECTIONS IN A VIRTUAL-PRIVATE-NETWORKING ENVIRONMENT

(75) Inventors: Vasthare Veerappagowda Ullas, Chickmagatur (IN); Mandavilli Swamy, Bangalore (IN); Suriyanarayanan Muthukumar, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 131 days.

(21) Appl. No.: 13/583,709

(22) PCT Filed: Apr. 7, 2010

(86) PCT No.: PCT/US2010/030290
§ 371 (c)(1),
(2), (4) Date: Sep. 10, 2012

(87) PCT Pub. No.: WO2011/126483
PCT Pub. Date: Oct. 13, 2011

(65) Prior Publication Data
US 2013/0010642 A1 Jan. 10, 2013

(51) Int. Cl.
*H04L 12/28* (2006.01)
*H04L 29/06* (2006.01)
(52) U.S. Cl.
CPC ......... *H04L 63/0272* (2013.01); *H04L 63/0236* (2013.01)
USPC .......................................... 370/254; 370/401

(58) Field of Classification Search
CPC ......... H04L 41/12; H04L 41/14; H04L 45/02; H04L 45/00; H04L 45/10; H04L 12/66; H04L 12/46; H04L 2012/46; H04L 2012/5618
USPC .......................................... 370/254, 400, 401
See application file for complete search history.

(56) References Cited

U.S. PATENT DOCUMENTS

| 5,796,736 | A  | * | 8/1998  | Suzuki ........................... 370/254 |
| 7,969,908 | B2 | * | 6/2011  | Ballantyne ..................... 370/254 |
| 2004/0165600 | A1 |   | 8/2004  | Lee |
| 2005/0177636 | A1 | * | 8/2005  | Jamieson et al. ............. 709/226 |
| 2006/0056314 | A1 | * | 3/2006  | Daures ........................... 370/254 |
| 2006/0072589 | A1 | * | 4/2006  | Mandavilli et al. ........... 370/400 |
| 2006/0171331 | A1 | * | 8/2006  | Previdi et al. ................. 370/254 |
| 2006/0209831 | A1 | * | 9/2006  | Shepherd et al. ............. 370/392 |
| 2007/0115962 | A1 | * | 5/2007  | Mammoliti et al. .......... 370/389 |
| 2007/0280241 | A1 | * | 12/2007 | Verma ............................ 370/392 |
| 2008/0091803 | A1 | * | 4/2008  | Liu ................................ 709/223 |

\* cited by examiner

*Primary Examiner* — Hong Cho

(57) ABSTRACT

One embodiment of the present invention is directed to a customer-edge-discovery subsystem, within a VPN-provider system interconnected with a public communications network, that automatically generates a data representation of a VPN-provider view of the network by: initializing the data representation; accessing tools and protocols available within the VPN-provider system to discover elements, connections, interfaces, VPNs, and other components and characteristics of the public communications network and include representations of the discovered elements, connections, interfaces, VPNs, and other components and characteristics of the public communications network in the data representation; and finding customer-edge devices for each provider-edge device to include in the data representation using broadcast domains or address-resolution-protocol caches.

13 Claims, 15 Drawing Sheets

SYSTEM AND METHOD FOR AUTOMATED DISCOVERY OF CUSTOMER-EDGE DEVICES AND INTERFACE CONNECTIONS IN A VIRTUAL-PRIVATE-NETWORKING ENVIRONMENT

TECHNICAL FIELD

The present invention is related to network management and, in particular, to an automated method and system for discovering customer-edge devices by a virtual-private-network-provider management system.

BACKGROUND

Computing networks provides a fundamental and important communications and distributed-computing medium within many different large commercial and governmental organizations as well as within small businesses and homes. Virtual private networks ("VPNs") allow geographically separated local computer networks to be interconnected through any of various public communications media, including the Internet, without compromising the security of the local networks and without changing the basic communications interfaces and addressing schemes used within the local networks. In the case of Internet-based VPNs, Internet-connected VPN provider-edge devices, including Internet routers ("PE devices") interface to customer-edge devices ("CE devices"), generally local-area-network routers, to provide interconnection of CE devices and the local networks in which they are included. VPN providers often need to automatically assemble a data representation of networks within which they provide VPNs, including characterization of the various CE devices and corresponding PE interfaces to which they interface. However, because the Internet addresses used by CE devices are not determined by VPN providers, it may be difficult for a VPN-provider management system to correctly assemble a correct and unambiguous data representation of a network environment. VPN providers, VPN customers, and many other people working in roles involved with computer networking and VPN provision continue to seek new and better automated methods for assembling data representations of networking environments.

DETAILED DESCRIPTION

Figure 1:
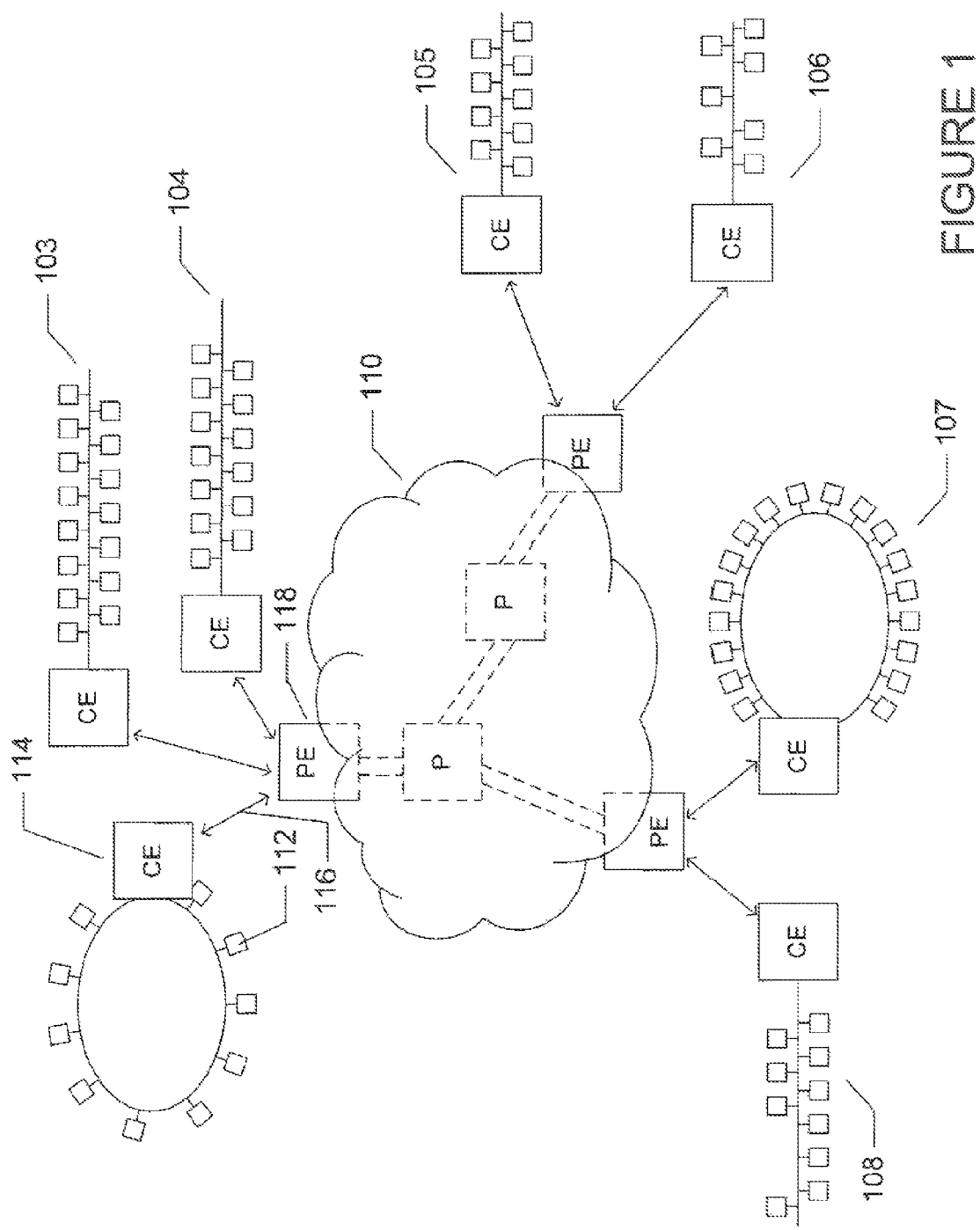
FIG. 1 provides an illustration of a computing networking environment.

FIG. 1 provides an illustration of a computing networking environment. In this networking environment, a number of local area networks ("LANs") 102-108 are interconnected to a public computing network 110. The LANs, such as LAN 102, include a number of computers, such as computer 112, that are interconnected by an ethernet LAN, a token-ring LAN, or some other LAN communications medium. In addition, each LAN includes a router, such as router 114, that interconnects the LAN 102 through a second computer-networking medium 116 to a route 118 within the public computer network 110. In an example used in the following discussion, the public computer network includes routers and other computers and devices that together comprise a portion of the Internet.

Figure 2:
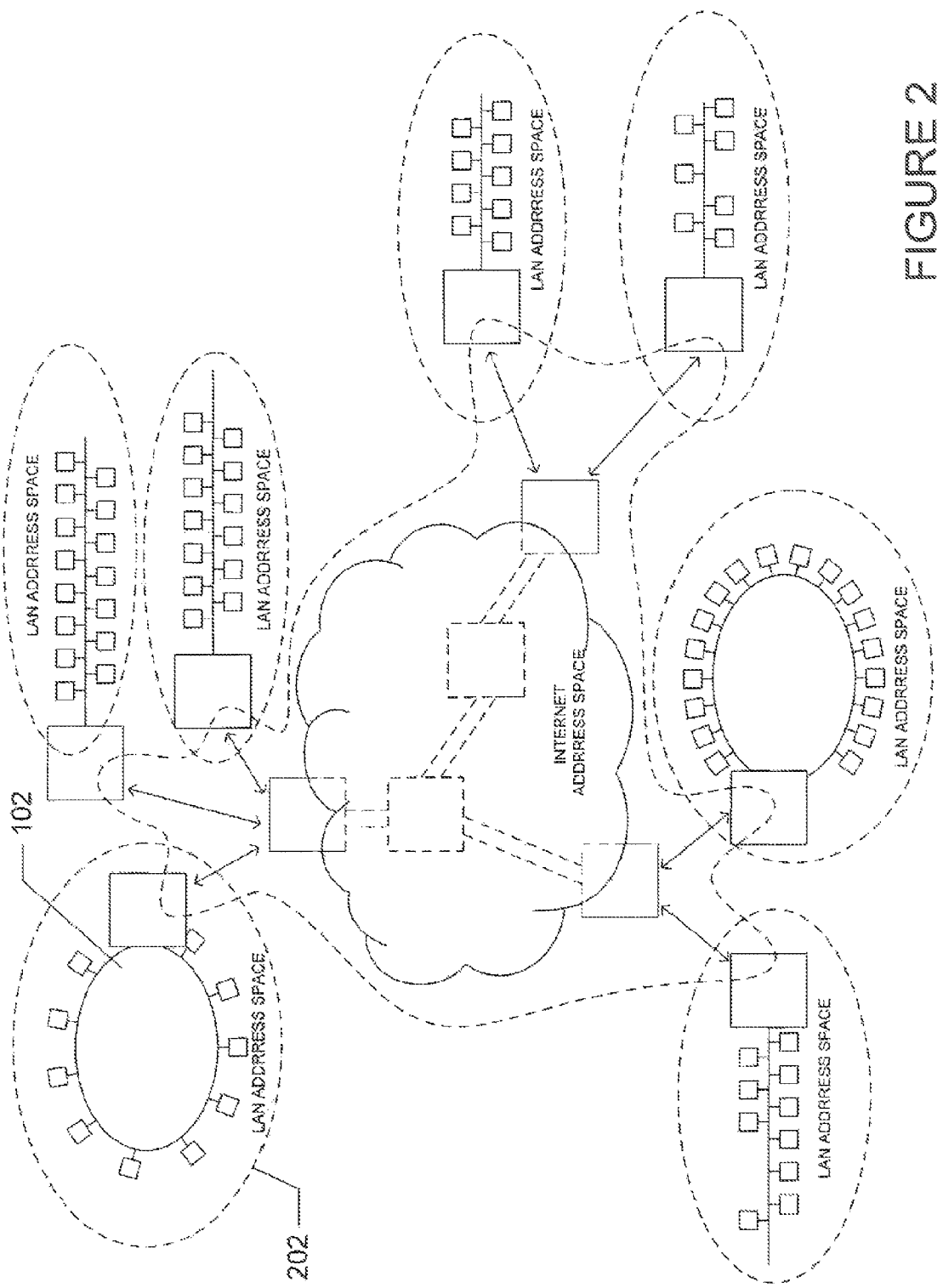
FIG. 2 illustrates the local-area networks and Internet public communications medium, discussed above with reference to FIG. 1, that represents separate address spaces.

FIG. 2 illustrates the local area networks and Internet public communication medium, discussed above with reference to FIG. 1, that represent separate address spaces. As shown in FIG. 2, each LAN and the Internet public communications medium, discussed above with reference to FIG. 1, represent separate address spaces. In FIG. 2, dashed lines, such as the dashed ellipse 202 enclosing LAN 102, indicate each different, separate address spaces. A typical ethernet LAN uses 64-bit ethernet-device addresses associated with network-interface controllers ("NICs") within the computers interconnected by the ethernet LAN. By contrast, in the Internet, 32-bit IPv4 (version-4 IP) or 128-bit IPv6 (version-6 IP) addresses are employed. These addresses provide for open-systems-interconnection ("OSI") layer-3 routing of Internet traffic among computers connected to the Internet, with communications ports on computers each associated with an Internet address. The correspondence between Internet addresses and OSI layer-2 addresses and physical addresses for NICs within the computers is maintained in Internet routers and other devices. LAN addresses and Internet addresses ("IP addresses") are assigned to devices by various network configuration processes. In addition, most NICs are encoded with a media-access-control address ("MAC address") that is globally unique.

Figure 3:
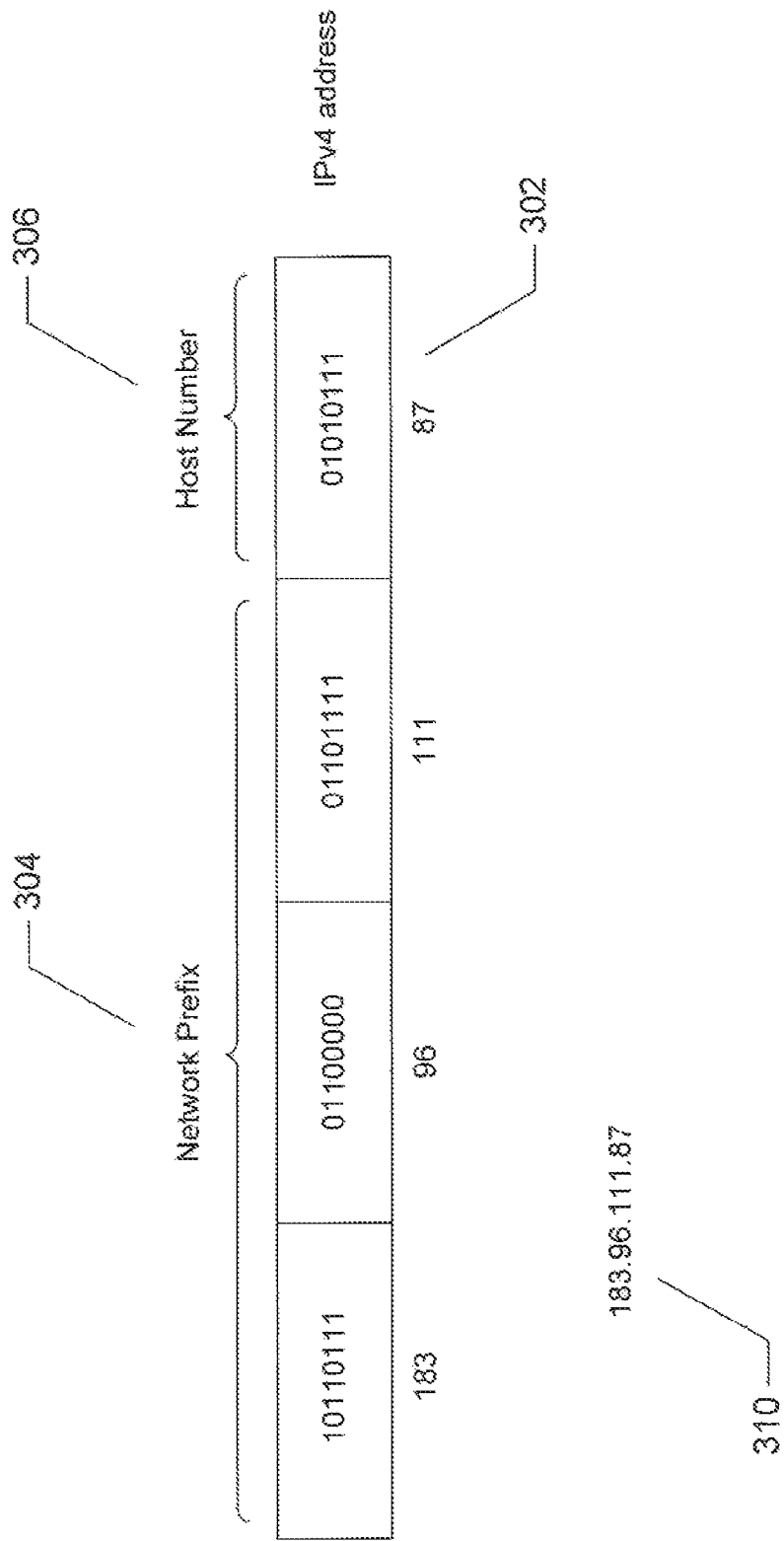
FIG. 3 shows an illustration of a version-4 IP address.

FIG. 3 shows an illustration of a version-4 IP address. The 32-bit, or 4-byte, IPv4 address 302 includes a 3-byte network prefix 304 and a 1-byte host number 300 which identities a particular host at the network location identified by the network prefix. Often, IPv4 addresses are written in decimal notation 310, with the decimal equivalent of each byte separated by "." symbols.

Figure 4:
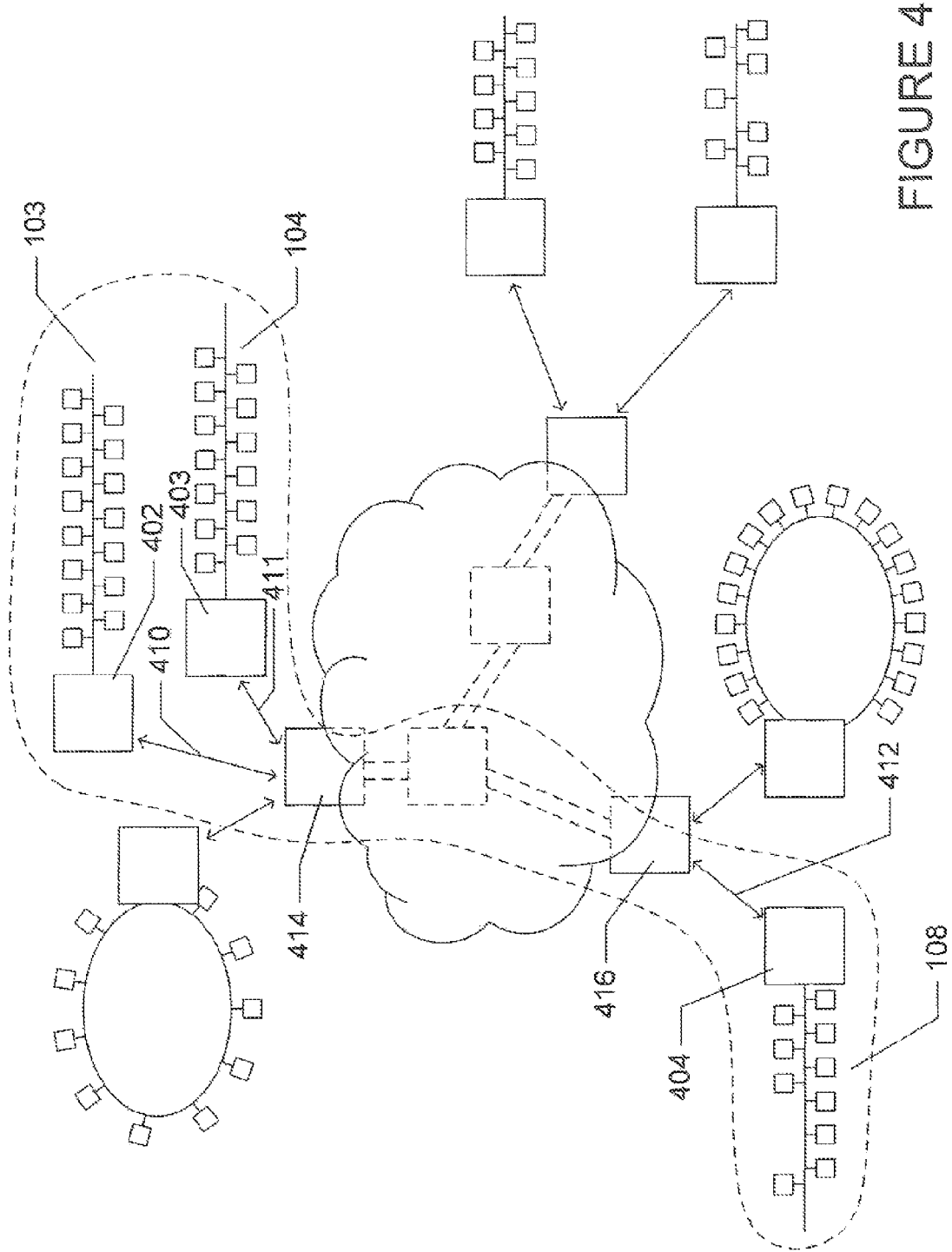
FIG. 4 illustrates a motivation for constructing a virtual private network.

FIG. 4 illustrates a motivation for constructing a virtual private network. In FIG. 4. LANs 103, 104, and 108 are used by a geographically dispersed organization, with each of LANs 103, 104, and 108 residing in a different geographical location. It would be convenient for the organization for these LANs to be interconnected to form a single, geographically dispersed LAN. Unfortunately, LAN media are length and distance constrained, and it is generally not possible to directly interconnect LANs together. Instead, the LANs are interconnected using routers 402-404. The routers are able to bridge two different communications media so that, for example, packets received by the router from a computer connected to the router by a LAN can be forwarded, over a telecommunications link, wide-area network link, or physical link to the Internet, to a remote router connected to a remote LAN to which a destination computer is connected. A virtual private network ("VPN") essentially provides a channel, or tunnel, through the Internet so that the geographically dispersed LANs can be interconnected via the Internet. Thus, as shown in FIG. 4, routers 402-404 are interconnected through communications links 410-412, respectively, to Internet routers or other Internet devices 414 and 416. In a multiprotocol-label-switching ("MPLS") VPN, the IP-addressing scheme is modified so that each VPN interconnecting two or more LANs to a particular customer is implemented as a separate channel, or tunnel, through the Internet by a VPN provider. The Internet traffic for each VPN is kept separate from that of other VPNs and non-VPN Internet traffic by a tunneling protocol. An MPLS VPN may additionally provide separate routing tables for each customer in order to provide a secure channel of communication over a shared network.

Figure 5:
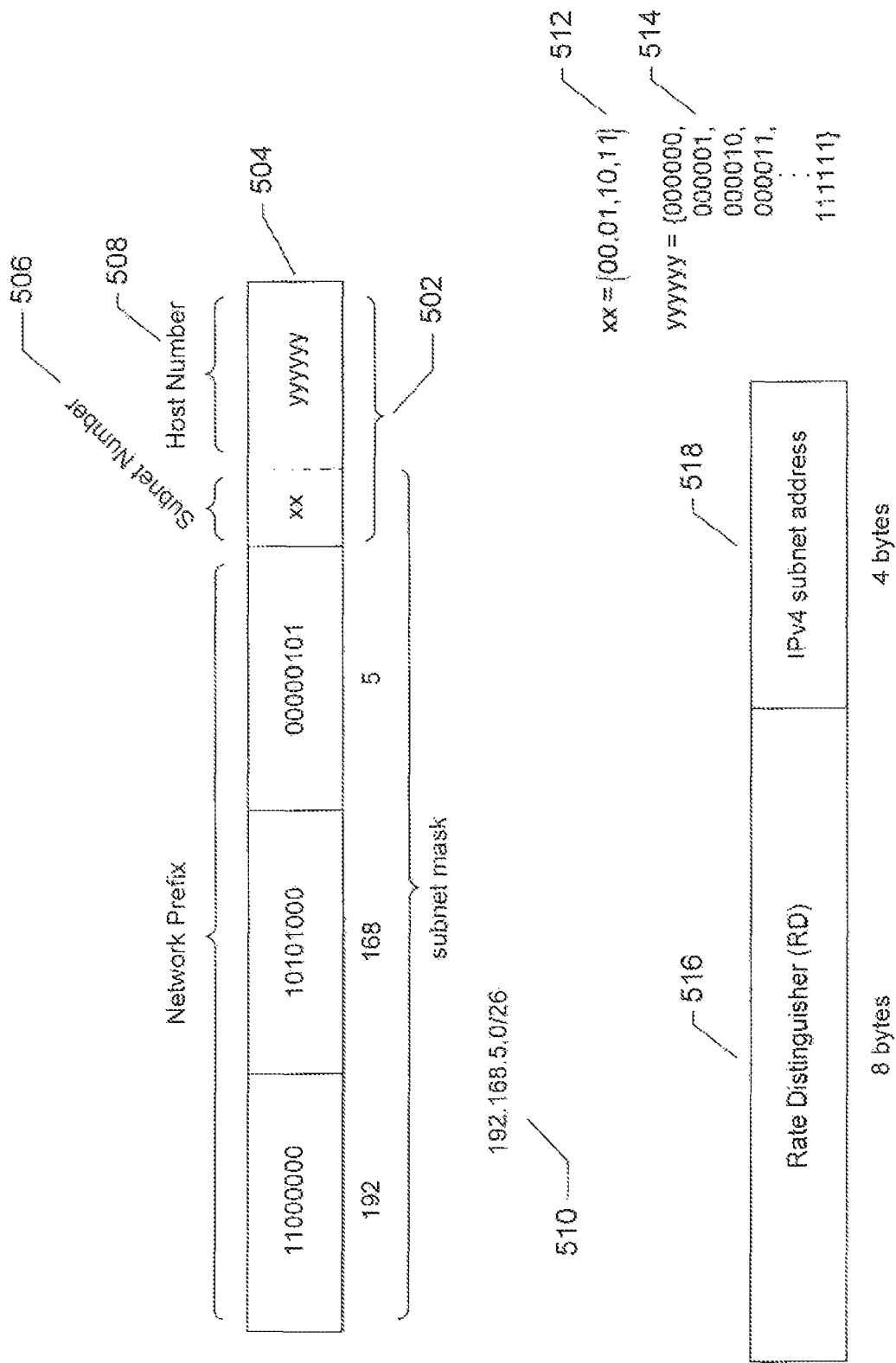
FIG. 5 illustrates changes to the IP-addressing scheme employed to create multi protocol-label-switching virtual private networks.

FIG. 5 illustrates changes to the IP-addressing scheme employed to create multi protocol-label-switching virtual private networks. The 1-byte host-number portion 502 of an IPv4 address 504 is subdivided into a two regions. (1) a number of bits corresponding to a subnet number 506; and (2) a host number 508. In the example shown in FIG. 5, two bits are allocated for the subnet number 506 and six remaining bits are allocated to the host number 508. The number of consecutive bits used for the network prefix and subnet number, in the example shown in FIG. 5, 26 bits, is considered to be the length of a subnet mask that can be used to extract either the host number or the networked prefix and subnet number from the IPv4 address. The subnet-enhanced IPv4 address is generally written, in decimal notation, to show the decimal equivalents of the byte values for the network prefix and the decimal equivalent of the subnet number, separated by "." symbols, after which the subnet-mask length is appended following a "/" symbol 510. In the example shown in FIG. 5, there are four possible subnet numbers (512 in FIG. 5) and 64 different possible 6-bit host numbers (514 in FIG. 5). In certain cases, the all-0 and all-1 host numbers are reserved. When VPN packets are exchanged among Internet devices, an 8-byte route distinguisher ("RD") 516 is appended to the IP address 518 to provide a label to facilitate ruining of the VPN packets from the first Internet device that receives the packet to the final Internet device that forwards the packet to a LAN router.

Figure 6:
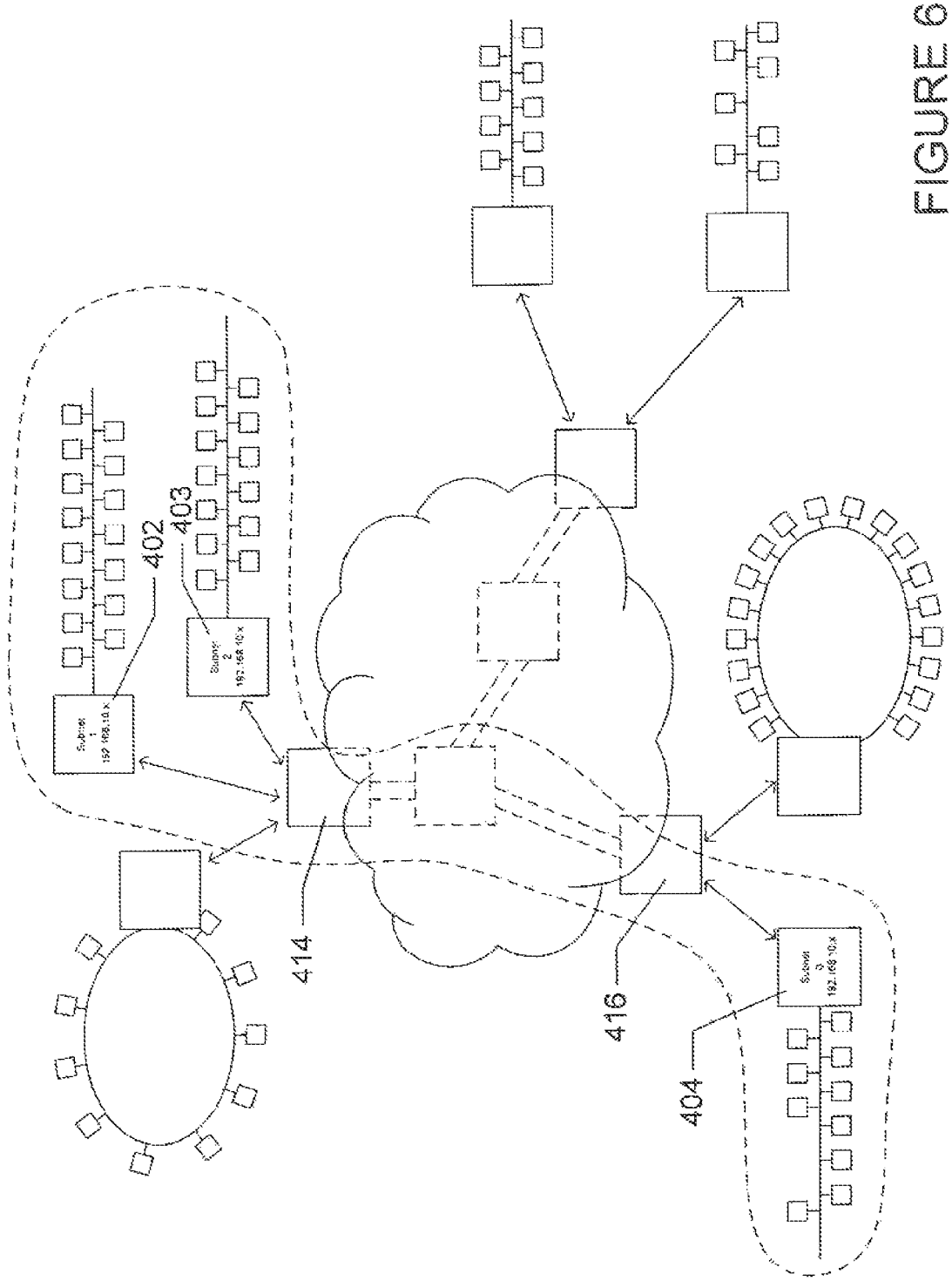
FIG. 6 shows subnet designations for the local-area networks of a virtual private network that interconnects three local area networks, discussed above with reference to FIG. 4.

FIG. 6 shows subnet designations for the local-area networks of a virtual private network that interconnects three local area networks, discussed above with reference to FIG. 4. As shown in FIG. 3, routers 402-404 are assigned Internet addresses with a common network prefix. Each LAN router is assigned a different subnet number, and the computers interconnected by each LAN are assigned a host number unique within the LAN. Thus, each computing device within the three LANs is assigned a unique IP address. As shown in FIG. 1, the Internet routers maintained by the VPN provider 414 and 416 are referred to as provider-edge devices ("PE devices") and the routers within LANs that interface to them are referred to as customer-edge devices ("CE devices").

Figure 7:
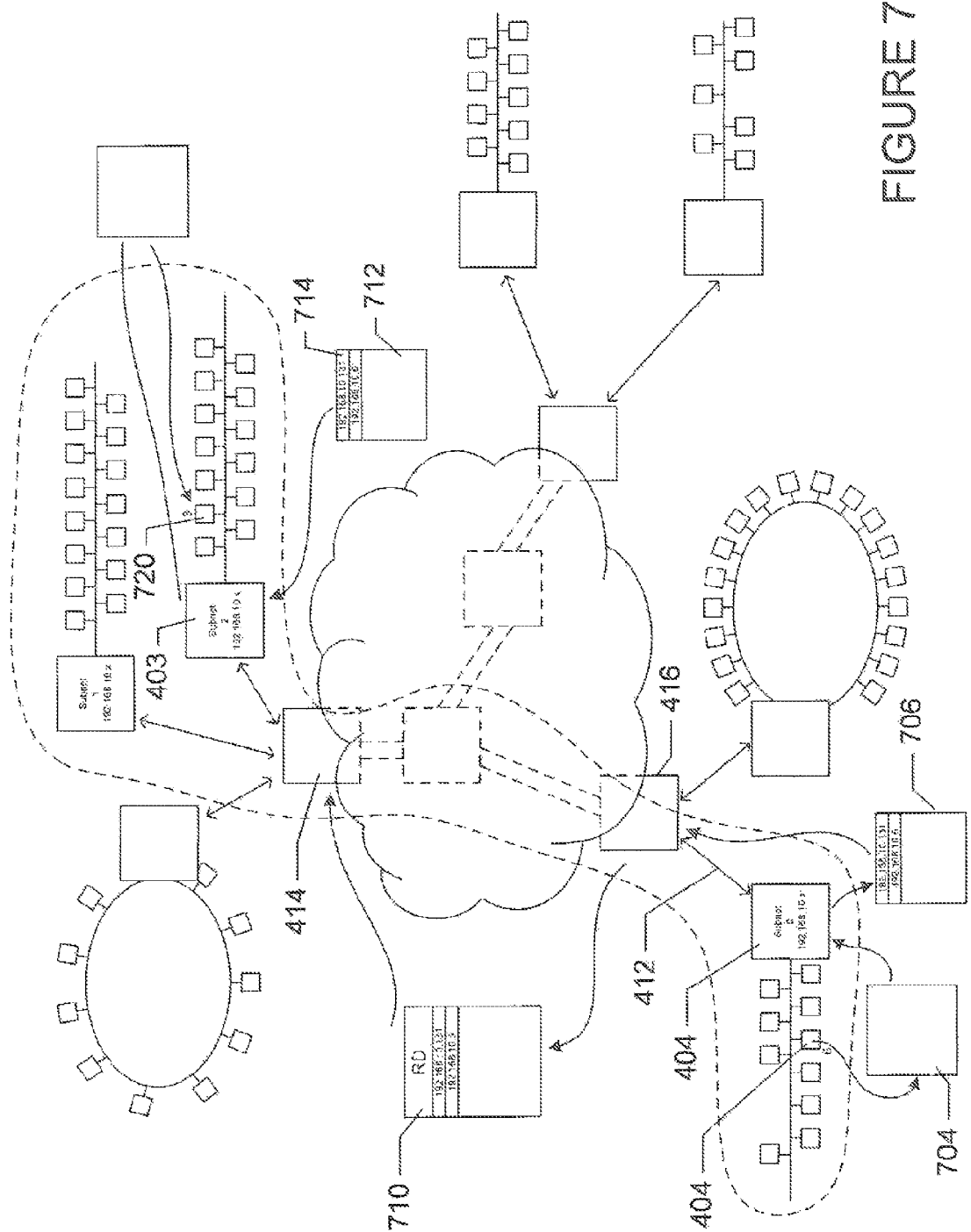
FIG. 7 illustrates transmission of a packet, or message, between two computers on geographically separate local area networks interconnected by a virtual private network.

FIG. 7 illustrates transmission of a packet, or message, between two computers on geographically separate local area networks interconnected by a virtual private network. The sending computer 702 transmits an OSI layer-2 packet 704 to the local CE device 404, which encapsulates the layer-2 packet into a layer-3 IP packet 706 that is transmitted through communications medium 412 to PE 416. PE 416 adds the RD 710 to the layer-3 packet and transmits the packet through the internet to PE device 414. PE device 414 removes the RD and transmits the layer-3 Internet packet 712 to CE device 403, which extracts the layer-2 packet from the layer-3 packet and transmits the layer-2 packet, using the appropriate layer-2 LAN address corresponding to the host number in the destination address 714 of the layer-3 IP packet to the destination computer 720.

Figure 8:
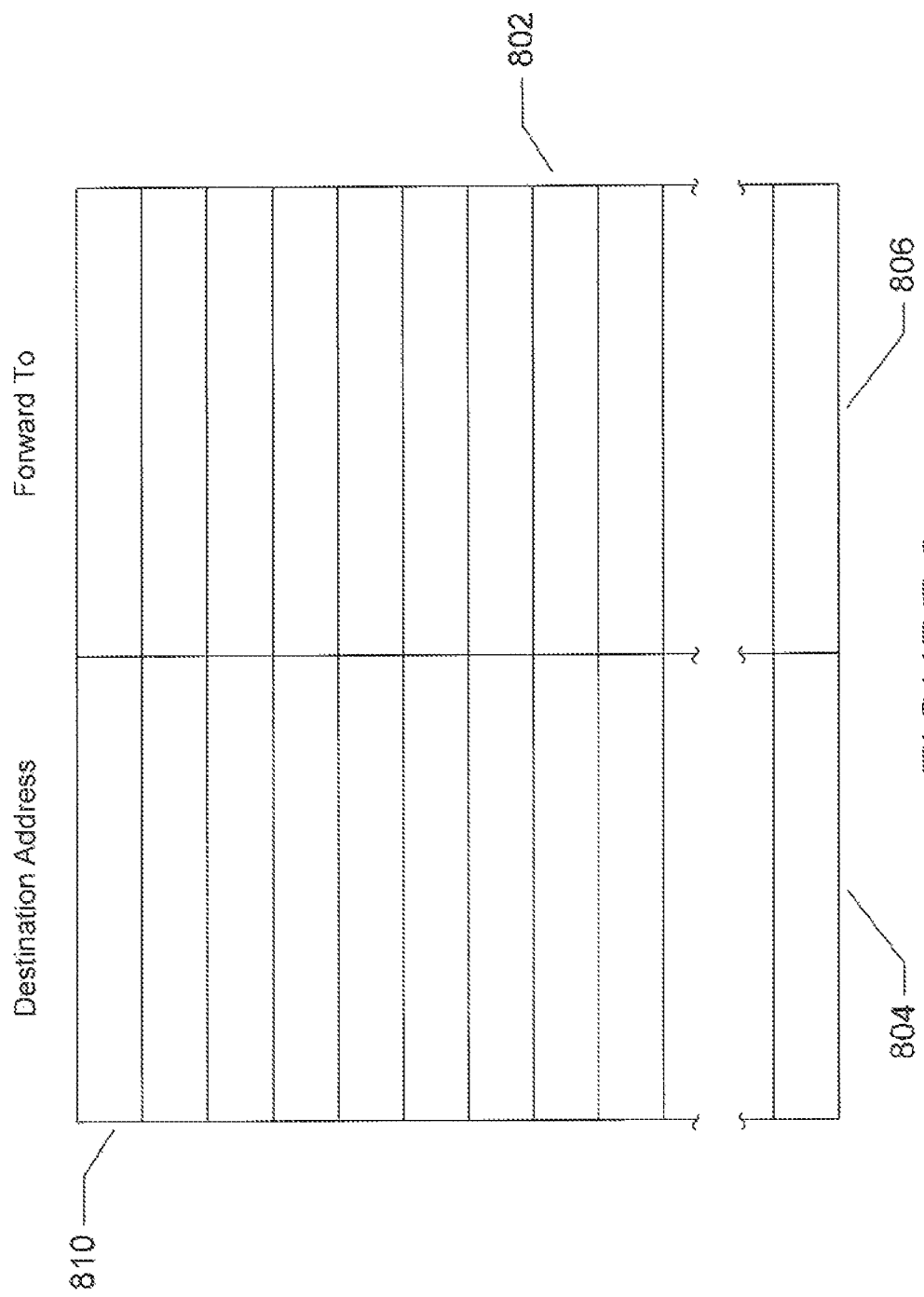
FIG. 8 illustrates the contents of a virtual routing and forwarding table.

Each PE device includes a separate virtual routing and forwarding ("VRF") table associated with each VPN for which the PE device transmits packets. FIG. 8 illustrates the contents of a virtual routing and forwarding table. The VRF table 802 includes pairs, one pair per row, of destination IP addresses, included in column 1 804, and corresponding next-hop IP addresses, included in column 806. A row in the table, such as row 810, designates the next-hop address, or forwarding address, for any received packet having a destination IP address. Each VRF table is associated with a particular VPN.

Figure 9:
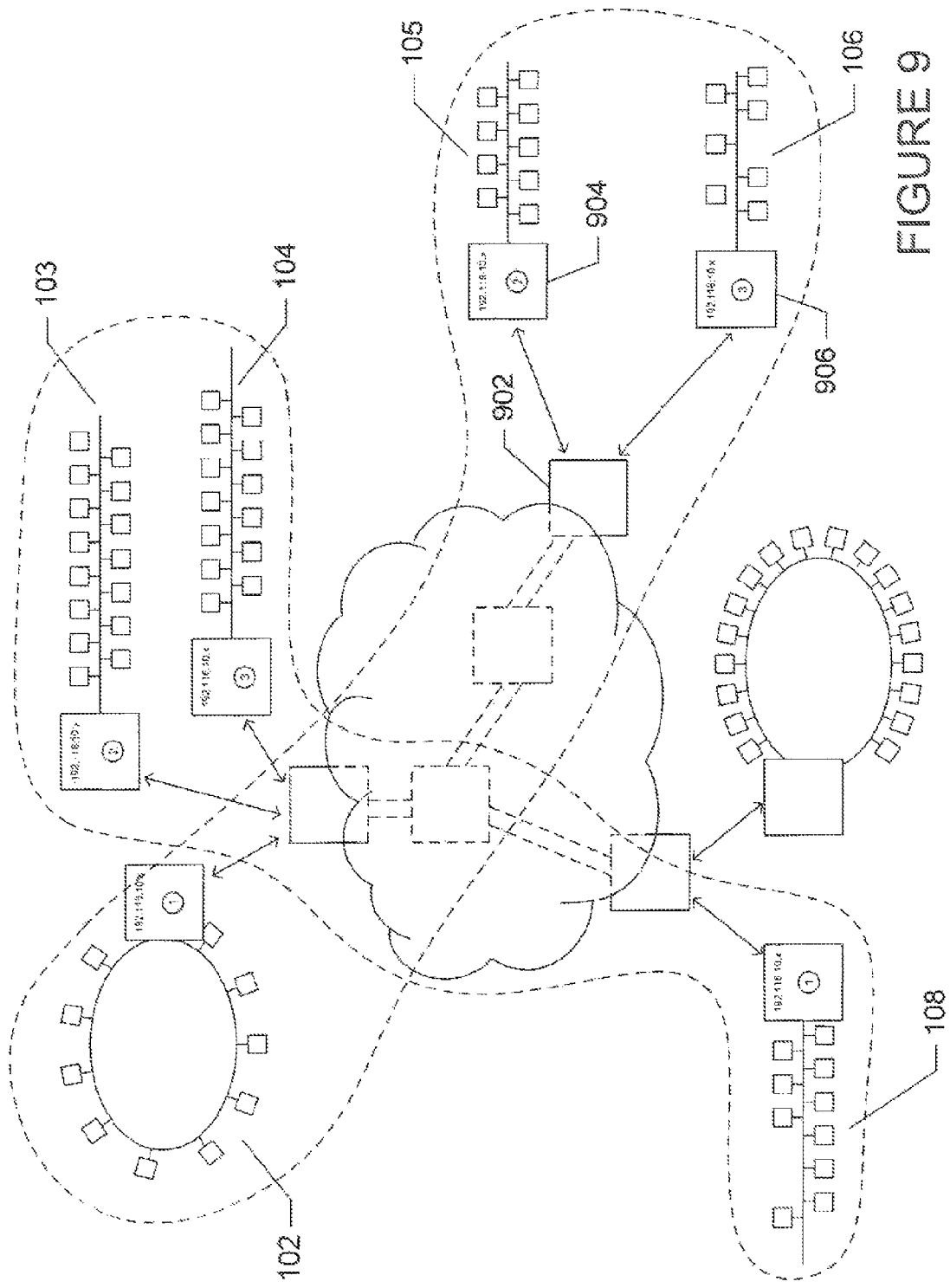
FIG. 9 illustrates a duplicate-address problem that may lead to difficulties in automated discovery of customer-edge devices by a virtual-private-network-provider system.

FIG. 9 illustrates a duplicate-address problem that may lead to difficulties in automated discovery of customer-edge devices by a virtual-private-network-provider system. In FIG. 9, LANs 103, 104, and 108 are interconnected through a first VPN, and LANs 102, 105, and 106 are interconnected through a second VPN. The two VPNs are indicated, in FIG. 9, by dashed lines enclosing their respective LANs. A single VPN provider provides both VPNs. Unfortunately, configuration of the CE devices by customers cannot be controlled by the VPN provider. A certain number of IP addresses are reserved for VPNs, but two different customers may configure their CE devices with the same network prefix, and may use identical subnet numbers, leading to duplicate IP addresses for CE devices Considering, for example, PE device 902, it is unclear, from considering IP addresses alone, to which VPN CE devices 904 and 906 belong.

Figure 10:
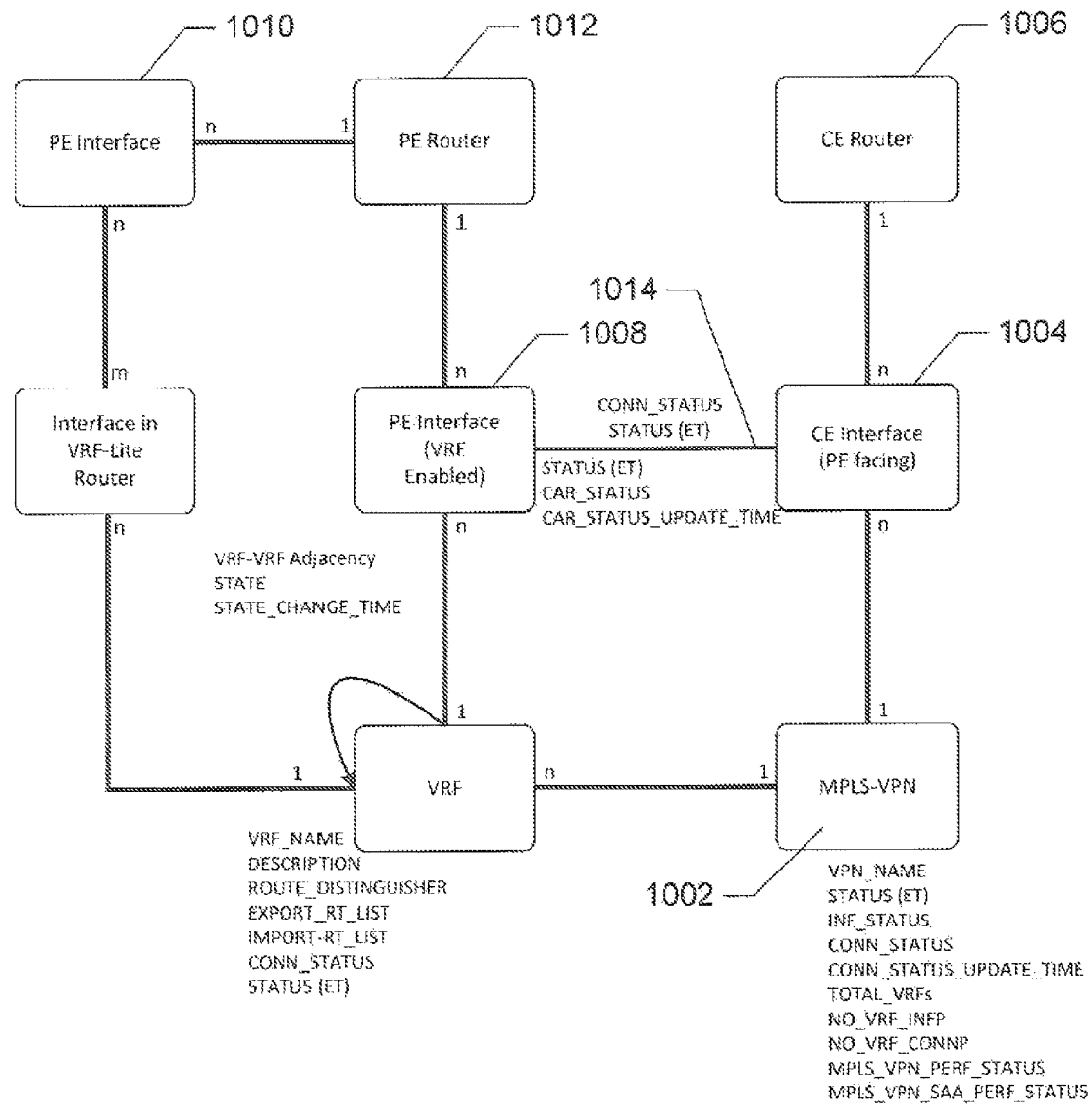
FIG. 10 shows an entity-relationship diagram for a data representation of a VPN-provider network environment.

Method and system embodiments of the present invention are directed to automated discovery of CE devices during automated network discovery, by a VPN-provider computer system. These methods and systems need to disambiguate duplicate CE IP addresses in order to properly assign discovered CE devices to corresponding VPNs and VRF-enabled interfaces within PE devices. In one embodiment of the present invention, a customer-edge-discovery subsystem of a network-management system is used to discover and unambiguously associate customer-edge devices with corresponding VRF-enabled interfaces within provider-edge devices. Using the CE-device-discovery subsystem, the network management system constructs is data representation of the elements, connections, interfaces, and other components and characteristics of a VPN-providers network. FIG. 10 shows an entity-relationship diagram for a data representation of a VPN within a VPN-provider network environment. The entity-relationship diagram is straightfowardly translated into relational tables within a relational database management system, as one example. Each VPN provided by the network provider is described by a VPN data structure 102, multiple CE interlaces 1004, each associated with a CE device 1006 and multiple PE interfaces 1008 and 1010, each associated with a PE device 1012. The CE-discovery subsystem that represents one embodiment of the present invention allows for unambiguous association 1014 of CE interfaces 1004 with corresponding PE interfaces 1008.

Figure 11A:
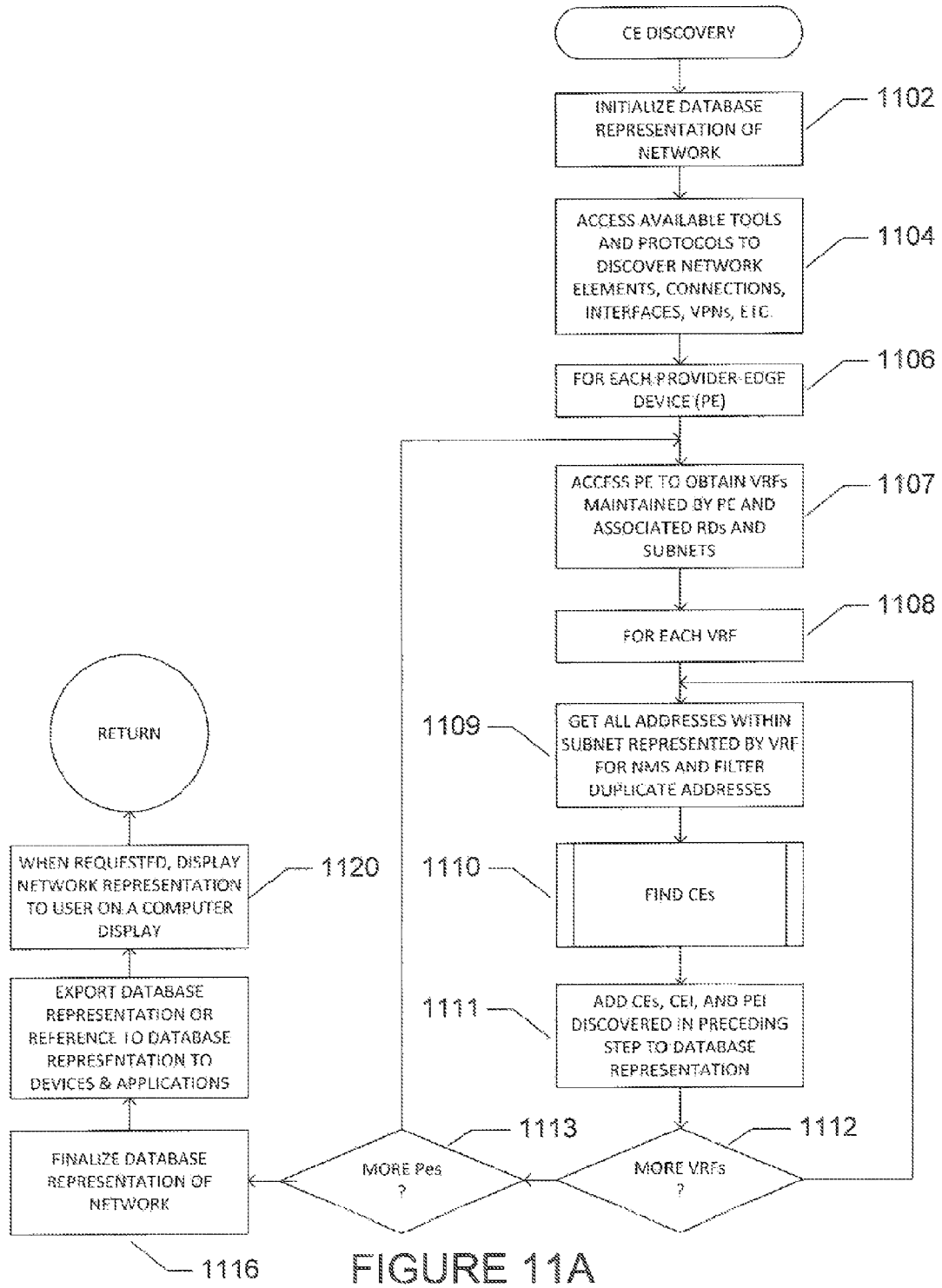
FIGS. 11A-D provide control-flow diagrams that illustrate a customer-edge-discovery method and operation of a customer-edge-discovery subsystem that represent embodiments of the present invention.

FIG. 11A-D provide control-flow diagrams that illustrate a customer-edge-discovery method and operation of a customer-edge-discovery subsystem that represent embodiments of the present invention. FIG. 11A provides a control-flow diagram for a routine "CE discovery" that embodies a method embodiment of the present invention that may be included within a VPN-provider computer system as a subcomponent, to facilitate automated network discovery, management, and configuration. In step 1102, a data representation of the network environment, which includes a data representation, such as that illustrated in FIG. 10, for each VPN provided by the VPN provides, is initialized within a database management system. Next, in step 1104, tools and protocols available within the VPN-provider system, including tools provided through an interlace to a network-management station ("NMS"), are accessed in order to discover the basic elements, connections, interfaces, VPNs, and other components and characteristics of the VPN-providers computer network. Thus, in this step, the NMS can discover all of the PE devices and other internal components of the VPN-providers networked computer system. In an outer for-loop comprising steps 1106-1113, the routine "CE discovery" considers each PE device discovered in step 1104. For the currently considered PE device in this outer for-loop, the PE device is accessed, through any of various interfaces, to obtain a list of the VRFs maintained by the PE and associated with different VPNs. Then, in an inner for-loop comprising steps 1108-1112, for each VRF discovered in step 1107 for a particular, currently considered PE device, all of the IP addresses associated with a subnet represented by the VRF are obtained from the VRF table, with duplicate addresses filtered. Then, in step 1110, the routine "find CE devices" is called to find all of the CE devices associated with the currently considered VRF. In step 1111, the CE devices discovered in step 1110, along with associated interfaces and corresponding PE interfaces are added to the data representation for the VPN for which the VRF is associated. In there are more VRFs to consider for the currently considered PE, as determined in step 1112, then control returns to step 1109. Otherwise, when there are more PE devices to consider, as determined in step 1113, then control returns to step 1107. Otherwise, the data representation of the VPN-providers computer network is completed and stored, as one or more database objects, such us relational tables, in step 1116. The data representation may be exported to various devices and applications, in step 1118, and, when requested, the data representation may be displayed to a user, network administrator, or other individual on a computer display in step 1120.

Figure 11B:
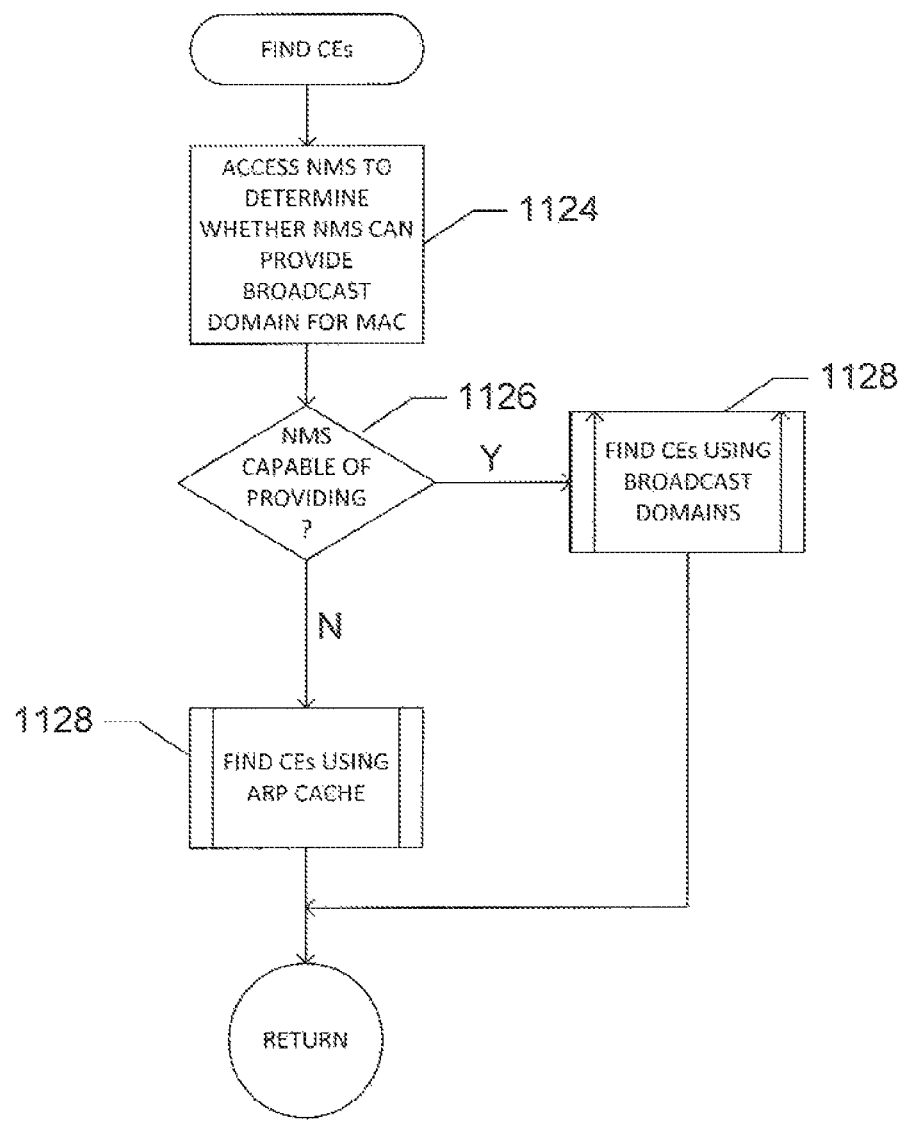

FIG. 11B provides a control-flow diagram for the routine "find CE devices" called in step 1110 of FIG. 11A. In step 1124, the NMS is accessed to determine whether or not NMS facilities can provide L2-layer addresses for the broadcast domain associated with a particular MAC address. When the NMS has this capability, as determined in step 1126, then the routine "find CE devices using broadcast domains" is called in step 1128. Otherwise the routine "find CE devices using ARP cache" is called in step 1130.

Figure 11C:
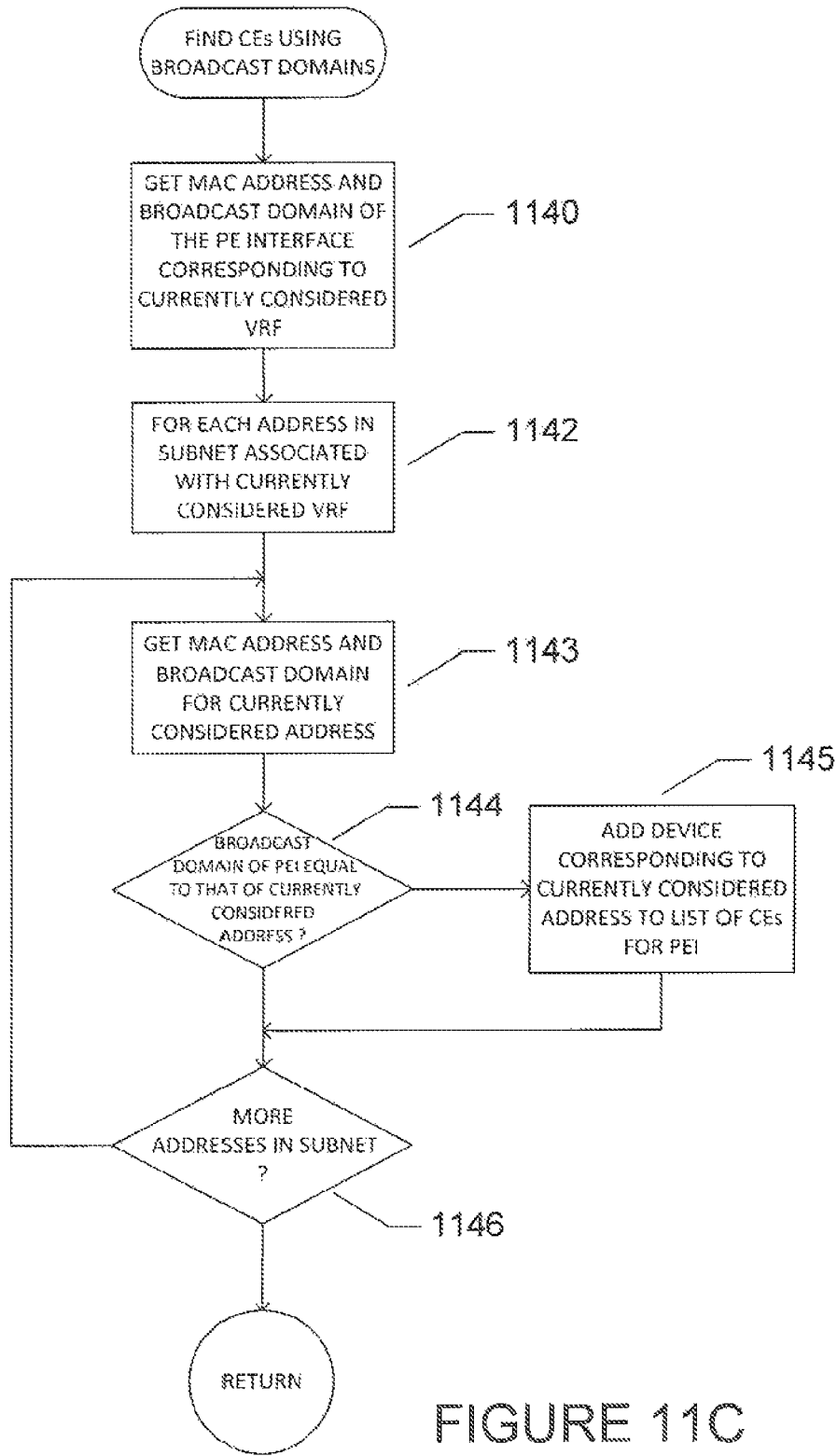

FIG. 11C provides a control-flow diagram for the routine "find CE devices using broadcast domains" called in step 1128 of FIG. 11B. In step 1140, NMS facilities are used to obtain the MAC address and broadcast domain of the PE interface corresponding to the currently considered VRF, where the currently considered VRF is the VRF currently considered in the for-loop of steps 1108-1112 of FIG. 11A. For each IP address in the subnet associated with the currently considered VRF, in the for-loop of steps 1142-1146, NMS facilities are employed to obtain the MAC address and broadcast domain for the currently considered IP address. When the broadcast domain of the PE interface corresponding to the currently considered VRF is equal to that of the currently considered IP address, as determined in step 1144, then the device corresponding to the currently considered IP address is added to a list of CE devices corresponding to the currently considered PE interlace. When there are more addresses to be considered in the for-loop of steps 1142-1146, as determined in step 1146, control returns to step 1143. Otherwise, the routine "find CE devices using broadcast domains" finishes, returning the list of CE devices.

Figure 11D:
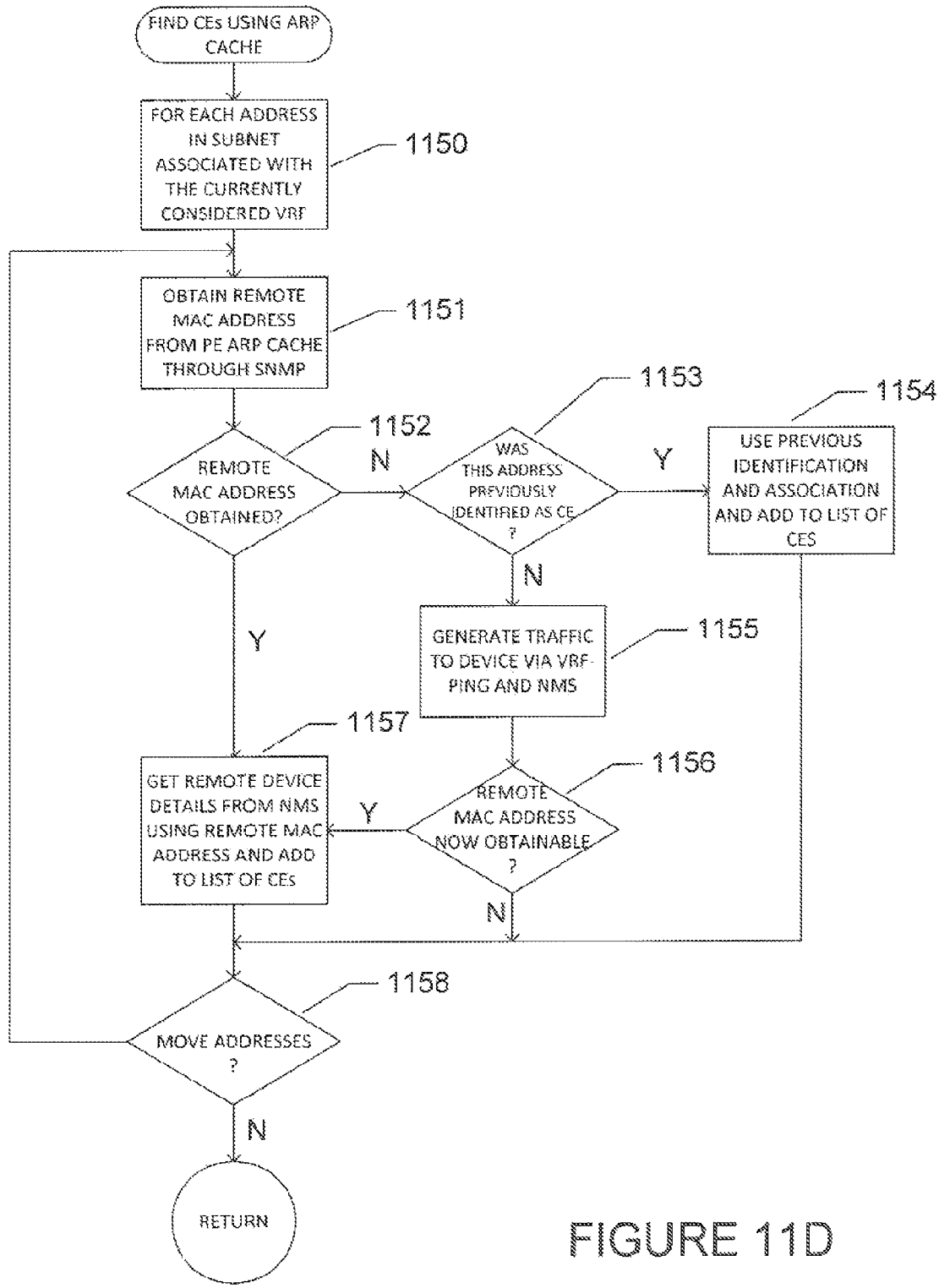

FIG. 11D provides a control-flow diagram for the routine "find CE devices using ARP cache," called in step 1130 in FIG. 11B. In a for-loop of steps 1150-1158, each IP address in the subnet associated with the currently-considered VRF is considered, where the currently-considered VRF is the VRF currently considered in the for-loop of steps 1108-1118 in FIG. 11A. In step 1151, the address-resolution-protocol ("ARP") cache within the PE device of the currently-considered PE device, where the currently-considered PE device is the PE device currently considered in the for-loop of steps 1106-1113 in FIG. 11A, is obtained through the Simple Network Management Protocol ("SNMP"), along with the MAC address of the PE device. When a remote MAC address for the currently considered IP address has been obtained from ARP cache, as determined in step 1152, then the details that characterize the device corresponding to remote address are obtained from an NMS facility using the remote MAC address and the device is added to the list of CE devices corresponding to the currently considered VRF, its step 1157. Otherwise, in step 1153, the routine "find CE devices using ARP cache" determines whether or not the currently considered IP address was previously identified as a CE. If so, then the previous identification and information associated with that identification is added to the list of CE devices associated with the currently considered VRF, in step 1154. Otherwise, a VRF-ping facility provided by the NMS via a PE router is used to generate synthetic traffic to the device associated with the currently considered IP address, in step 1155, and the remote MAC address for the device is again attempted to be obtained by accessing the ARP cache of the currently considered PE using the SNMP, in step 1156. When the remote MAC address is obtained, the device is added to the list of CE devices associated with the currently considered VRF, in step 1157. When then are more addresses to consider, as determined in step 1158, control returns to step 1151.

Figure 12:
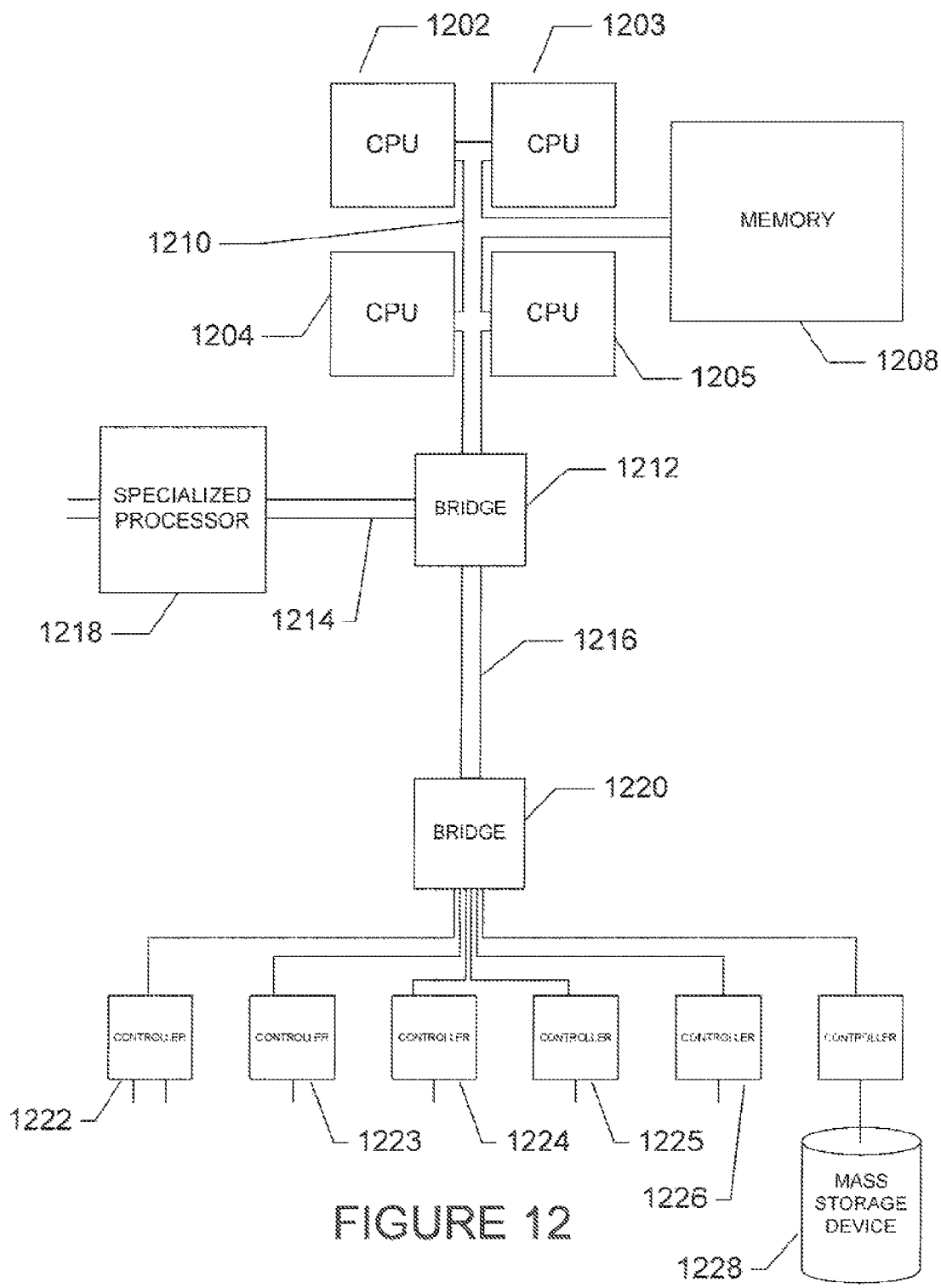
FIG. 12 illustrates a typical electronic computer on which customer-edge-device discovery methods and subsystems are implemented according to certain embodiments of the present invention.

FIG. 12 illustrates a typical electronic computer on which customer-edge-device discovery methods and subsystems are implemented according to certain embodiments of the present invention. The computer system contains one or multiple central processing units ("CPUs") 1202-1205, one or more electronic memories 1208 interconnected with the CPUs by a CPU/memory-subsystem bus 1210 or multiple busses, a first bridge 1212 that interconnects the CPU/memory-subsystem bus 1210 with additional basses 1214 and 1216, or other types of high-speed interconnection media, including multiple, high speed serial interconnects. These busses or serial interconnections, in turn, connect the CPUs and memory with specialized processors such as a graphics processor 1218, and with one or more additional bridges 1220, which are interconnected with high-speed serial links or with multiple controllers 1222-1227, such as controller 1227, that provide access to various different types of mass-storage devices 1228, electronic displays, input devices, and other such components, subcomponents, and computational resources. Embodiments of the present invention may also be implemented on distributed computer systems and can also be implemented partially in hardware logic circuitry.

Although the present invention has been described in terms of particular embodiments, it is not intended that the invention be limited to these embodiments. Modifications will be apparent to those skilled in the art. For example, the CE-discovery subsystem and method embodiments of the present invention can be implemented in many different ways by varying any of the many different implementation parameters, including programming language, modular organization, control structures, data structures, underlying operating system, and other such implementation parameters. In alternative embodiments, portions of the CE-discovery subsystem may be directly implemented in logic circuits within hardware or in firmware. In various different network-information-retrieval facilities many of various different network components may be accessed in order to obtain information needed for constructing the data representation of the VPN-provider network, according to various different implementations of the present invention.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to therein enable others skilled in the art to best utilize the invention and various embodiments with various modifications as are suited to the particular use contemplated. It is intended that the scope of the invention be defined by the following claims and their equivalents:

The invention claimed is:

1. A customer-edge-discovery subsystem comprising:
    one or more computers within a VPN-provider system interconnected with a public communications network; and
    instructions, stored in an electronic memory, which encode the customer-edge-discovery subsystem that automatically generates a data representation of a VPN-provider view of the network, stored in one or more of a database, memory, mass-storage device, and other computer-readable data-storage medium by:
        initializing the data representation;
        accessing tools and protocols available within the VPN-provider system to discover elements, connections, interfaces, VPNs, and other components and characteristics of the public communications network and include representations of the discovered elements, connections, interfaces, VPNs, and other components and characteristics of the public communications network in the data representation; and
        finding customer-edge devices ("CEs") for each provider-edge device ("PE") using broadcast domains or address-resolution-protocol ("ARP") caches and including representations of the discovered CEs in the data representation of the VPN-provider view of the network;
        wherein finding CEs for each PE using broadcast domains or ARP caches further comprises:
            accessing the PE to obtain virtual routing and forwarding ("VRF") tables maintained by the PE for each PE in the VPN-provider view of the network;
            extracting from the VRF all network addresses within a subnet represented by the VRF for each VRF table,
            filtering duplicate network addresses from the extracted network addresses; and
            using the extracted addresses to find the CEs for the PE.

2. The customer-edge-discovery subsystem of claim 1 further including displaying a visual representation of all or a portion of the data representation of a VPN-provider view of the network on an electronic display device.

3. The customer-edge-discovery subsystem of claim 1 wherein using the extracted addresses to find the CEs for the PE further includes:
    accessing a network management system ("NMS") to determine whether or not NMS facilities can provide L2-layer addresses for the broadcast domain associated with a particular media-access-control ("MAC") address;
    when the NMS can provide the L2-layer addresses, using broadcast domains to find the CEs for the PE; and
    when the NMS cannot provide the L2-layer addresses, using ARP caches to find the CEs for the PE.

4. The customer-edge-discovery subsystem of claim 1 wherein finding CEs for each PE using broadcast domains further includes:
    for each VRF maintained by the PE,
        using NMS facilities to obtain a media-access-control ("MAC") address and broadcast domain of a PE interface corresponding to the VRF; and
        finding CEs associated with network addresses in the subnet associated with the VRF.

5. The customer-edge-discovery subsystem of claim 4 wherein finding CEs associated with network addresses in the subnet associated with the VRF further includes:
    for each network address in the subnet associated with the VRF,
        employing NMS facilities to obtain the MAC address and broadcast domain for the network address,
        when the broadcast domain of a PE interface corresponding to the VRF is equal to that of the network address,
            adding a device corresponding to the network address to a list of CE devices corresponding to the PE interface; and
    adding data representations of the CE devices in the list of CE devices to the data representation of the VPN-provider view of the network.

6. The customer-edge-discovery subsystem of claim 1 wherein finding CEs for each PE using ARP caches further includes:
    for each VRF maintained by the PE,
        for each network address in the subnet associated with the VRF,
            attempting to obtain, from an ARP cache within the PE device, a MAC address for the network address,
            when the MAC address for the network address is obtained,
                obtaining details for the MAC address from the NMS and adding the details to a list of CEs; and
    adding data representations of the CE devices in the list of CE devices to the data representation of the VPN-provider view of the network.

7. The customer-edge-discovery subsystem of claim 6 further including:

when the MAC address for the network address is not obtained from the ARP cache within the PE device,
generating artificial traffic to the MAC address and again attempting to obtain, from an ARP cache within the PE device.

8. The customer-edge-discovery subsystem of claim 6 further including exporting the data representation of the VPN-provider view of the network to one or more computational entities, including remote computers, remote devices, local application programs, and remote application programs.

9. A method that automatically generates a data representation of a VPN-provider view of a public communications network, stored in one or more of a database, memory, mass-storage device, and other computer-readable data-storage medium, the method carried out by one or more electronic computers within a VPN-provider system interconnected with the public communications network on which virtual private networks ("VPNs") are maintained by a VPN provider, the method comprising:
 initializing the data representation of the VPN-provider view of the network;
 accessing tools and protocols available within the VPN-provider system to discover elements, connections, interfaces, VPNs, and other components and characteristics of the public communications network and include representations of the discovered elements, connections, interfaces, VPNs, and other components and characteristics of the public communications network in the data representation of the VPN-provider view of the network; and
 finding customer-edge devices ("CEs") for each provider-edge device ("PE") using broadcast domains or address-resolution-protocol ("ARP") caches and including representations of the discovered CEs in the data representation of the VPN-provider view of the network;
 wherein finding CEs for each PE using broadcast domains or ARP caches further comprises:
  accessing the PE to obtain virtual routing and forwarding ("VRF") tables maintained by the PE for each PE in the data representation of the VPN-provider view of the network;
  extracting from the VRF all network addresses within a subnet represented by the VRF for each VRF table;
  filtering duplicate network addresses from the extracted network addresses; and
  using the extracted addresses to find the CEs for the PE.

10. The method of claim 9 further including displaying a visual representation of all or a portion of the data representation of a VPN-provider view of the network on an electronic display device.

11. The method of claim 9 wherein using the extracted addresses to find the CEs for the PE further includes:
 accessing a network management system ("NMS") to determine whether or not NMS facilities can provide L2-layer addresses for the broadcast domain associated with a particular media-access-control ("MAC") address;
 when the NMS can provide the L2-layer addresses, using broadcast domains to find the CEs for the PE; and
 when the NMS cannot provide the L2-layer addresses, using ARP caches to find the CEs for the PE.

12. The method of claim 9 wherein finding CEs for each PE using broadcast domains further includes:
 for each VRF maintained by the PE,
  using NMS facilities to obtain a media-access-control ("MAC") address and broadcast domain of a PE interface corresponding to the VRF; and
  for each network address in the subnet associated with the VRF,
   employing NMS facilities to obtain the MAC address and broadcast domain for the network address,
   when the broadcast domain of a PE interface corresponding to the VRF is equal to that of the network address,
    adding a device corresponding to the network address to a list of CE devices corresponding to the PE interface; and
   adding data representations of the CE devices in the list of CE devices to the data representation of the VPN-provider view of the network.

13. The method of claim 9 wherein finding CEs for each PE using ARP caches further includes:
 for each VRF maintained by the PE,
  for each network address in the subnet associated with the VRF,
   attempting to obtain, from an ARP cache within the PE device, a MAC address for the network address,
   when the MAC address for the network address is obtained,
    obtaining details for the MAC address from the NMS and adding the details to a list of CEs,
   when the MAC address for the network address is not obtained from the ARP cache within the PE device,
    generating artificial traffic to the MAC address and again attempting to obtain, from an ARP cache within the PE device, and
 adding data representations of the CE devices in the list of CE devices to the data representation of the VPN-provider view of the network.

* * * * *